Figure 1:
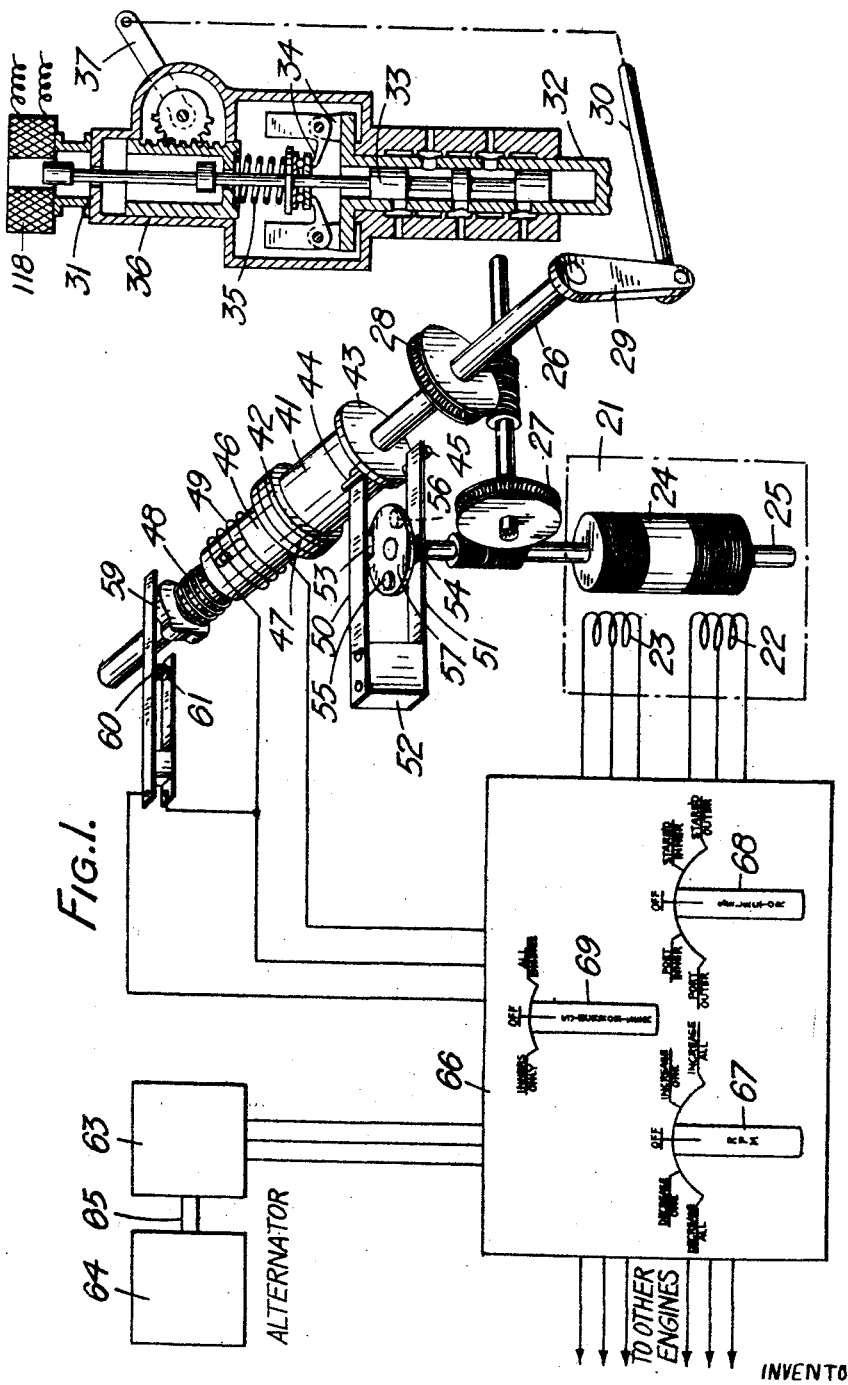

Dec. 7, 1954　　　J. A. CHILMAN　　　2,696,269
APPARATUS, INCLUDING VARIABLE PITCH PROPELLER
FOR SYNCHRONIZING THE SPEEDS OF PRIME MOVERS
Filed March 3, 1951　　　　　　　　　9 Sheets-Sheet 1

INVENTOR
J. A. CHILMAN
By
Wilkinson + Mawhinney
ATTORNEYS

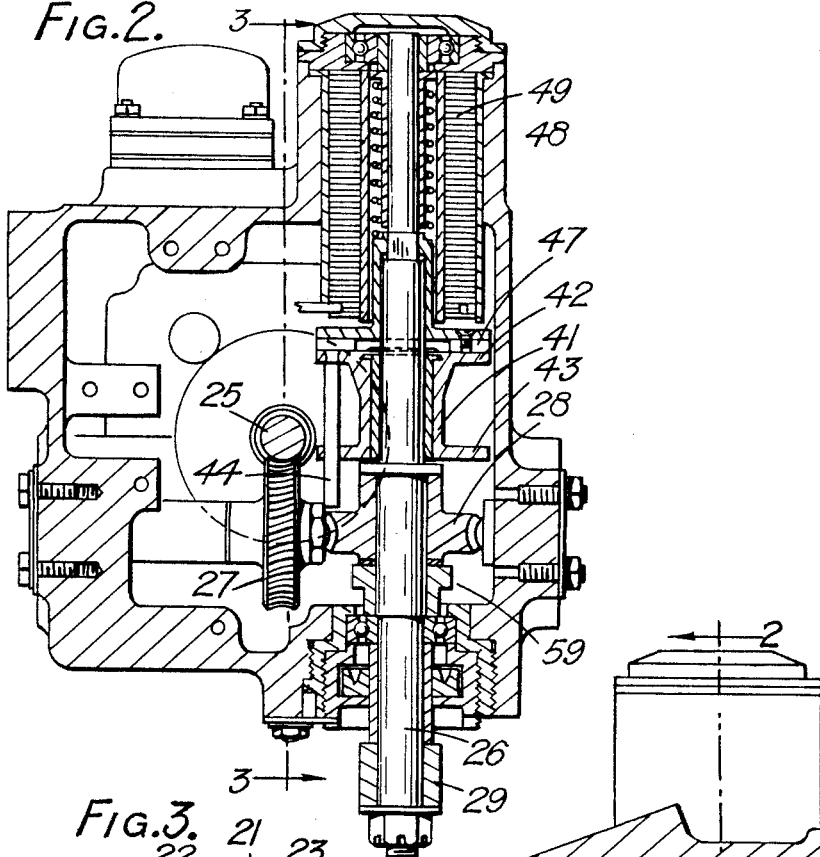
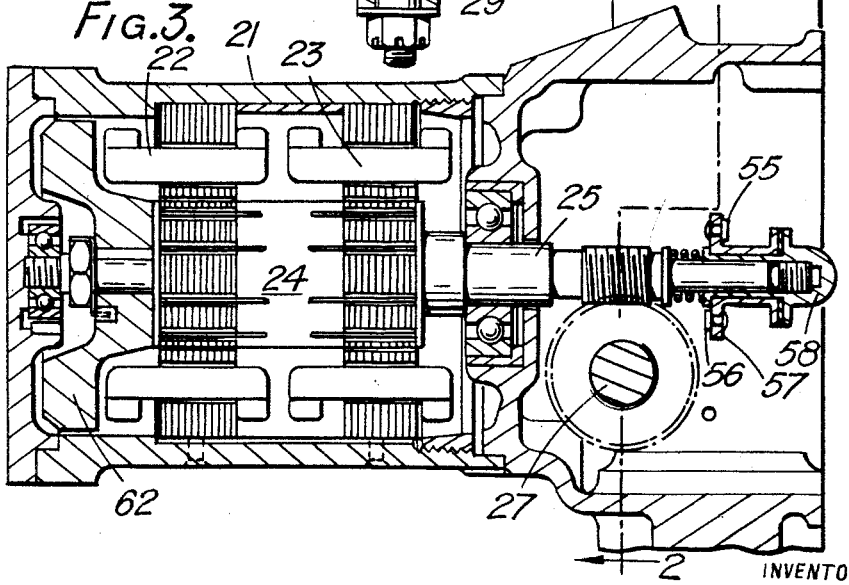

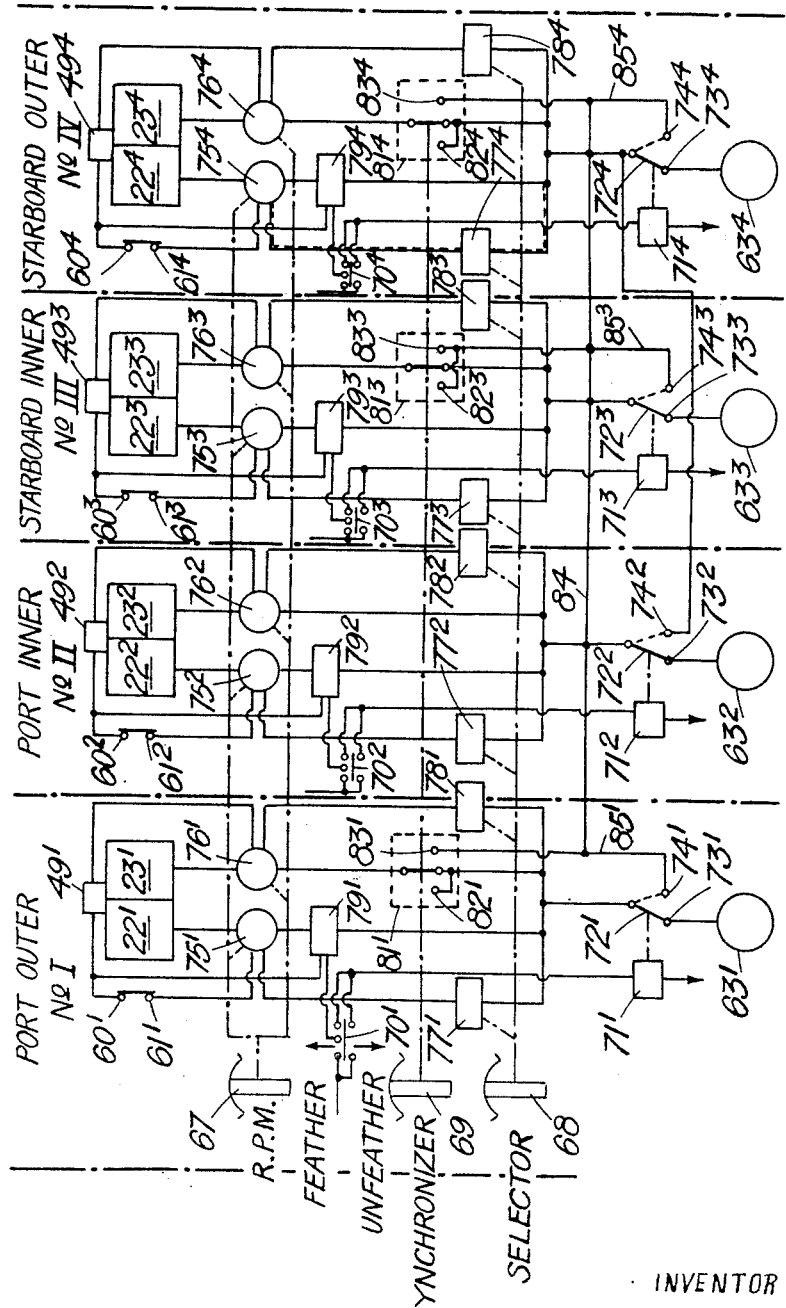

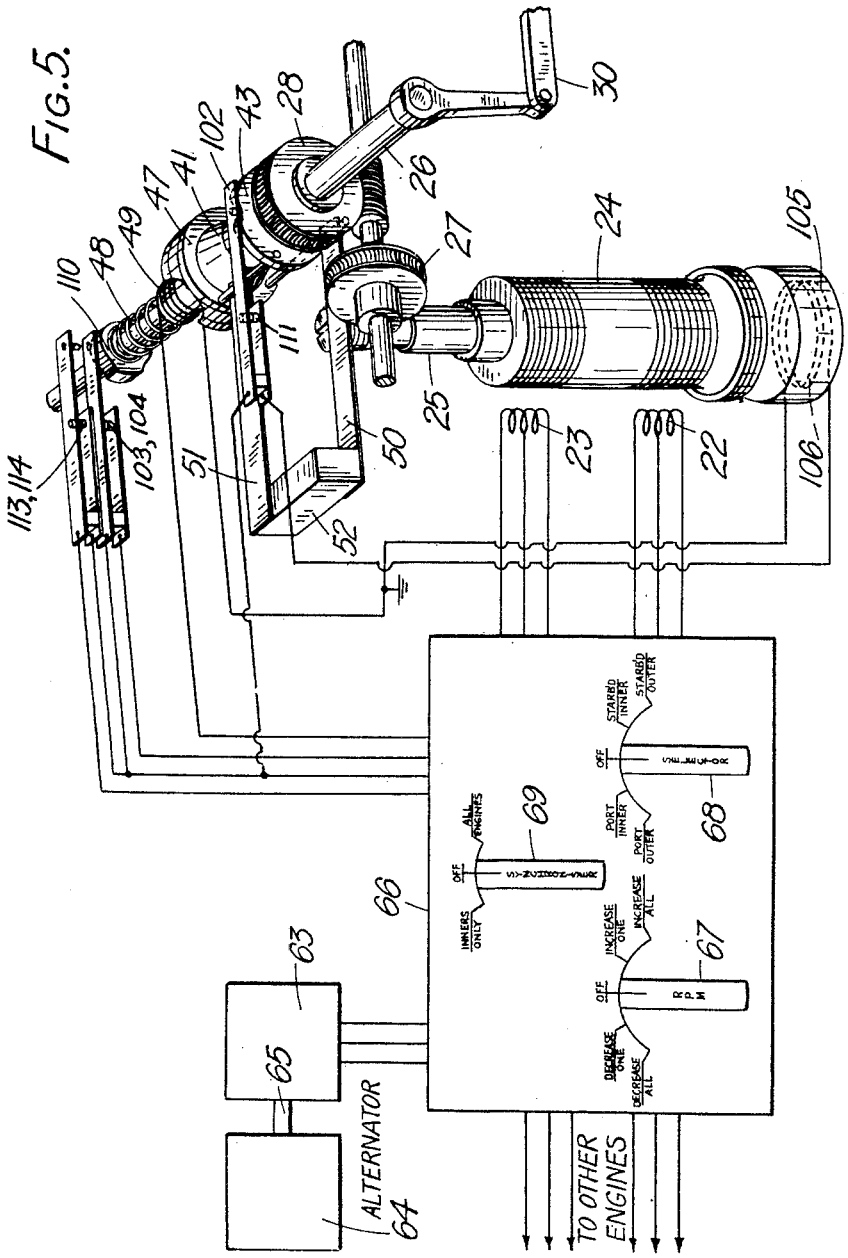

INVENTOR
J. A. CHILMAN
By Wilkinson + Mawkinney
ATTORNEYS

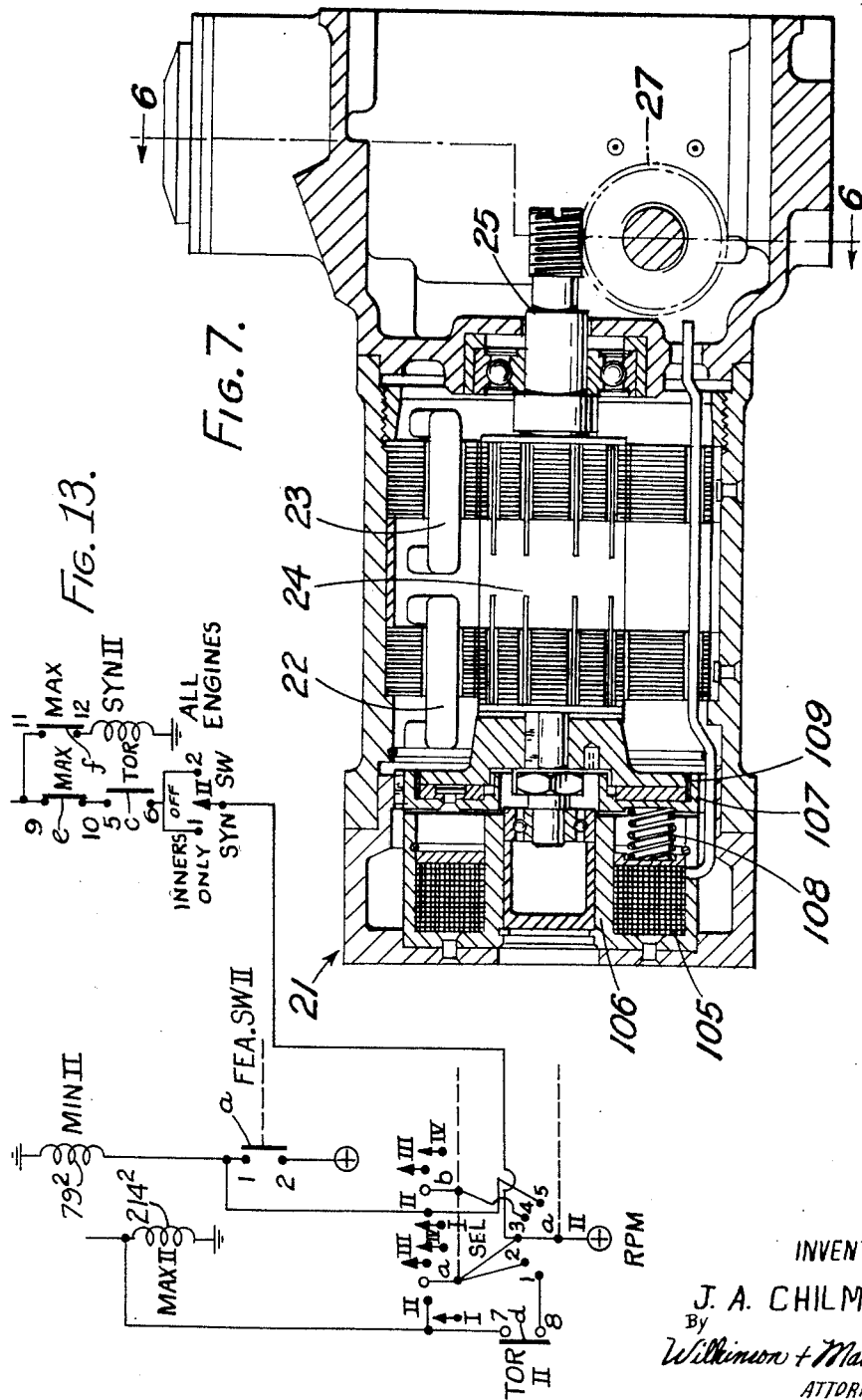

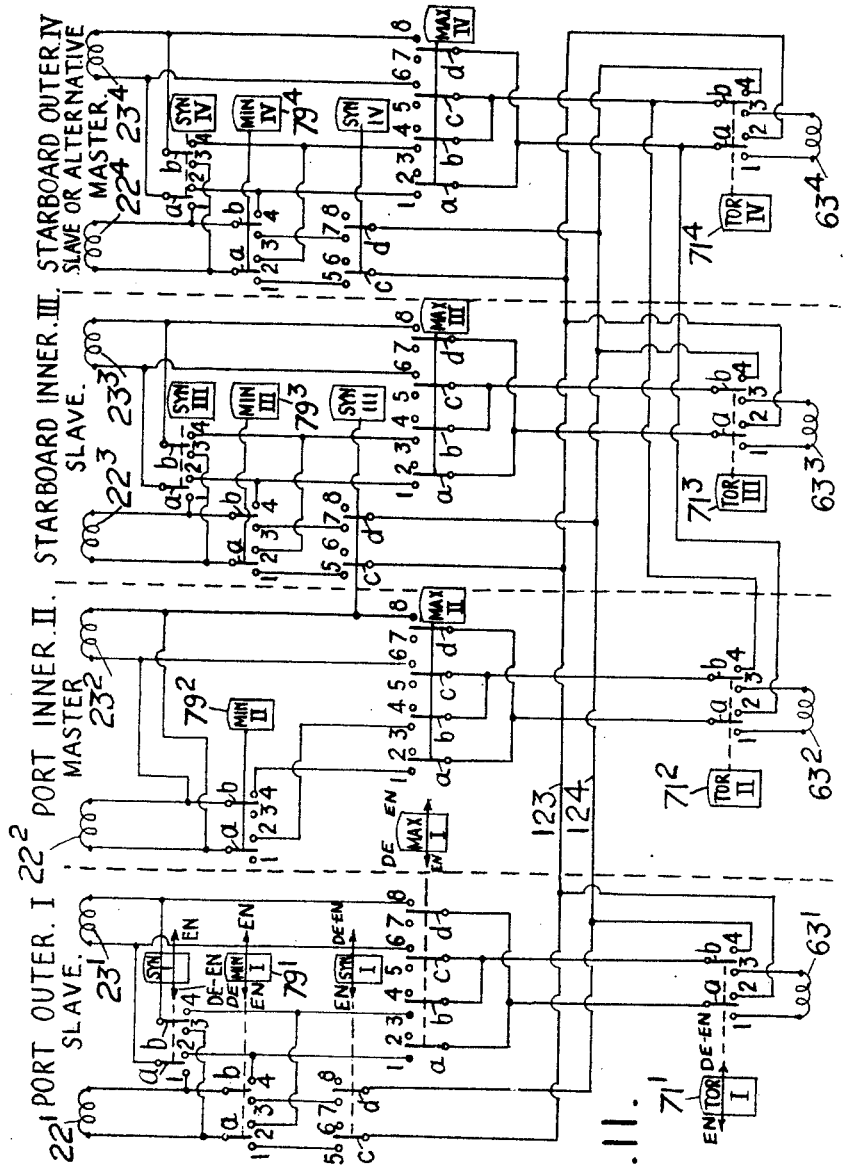

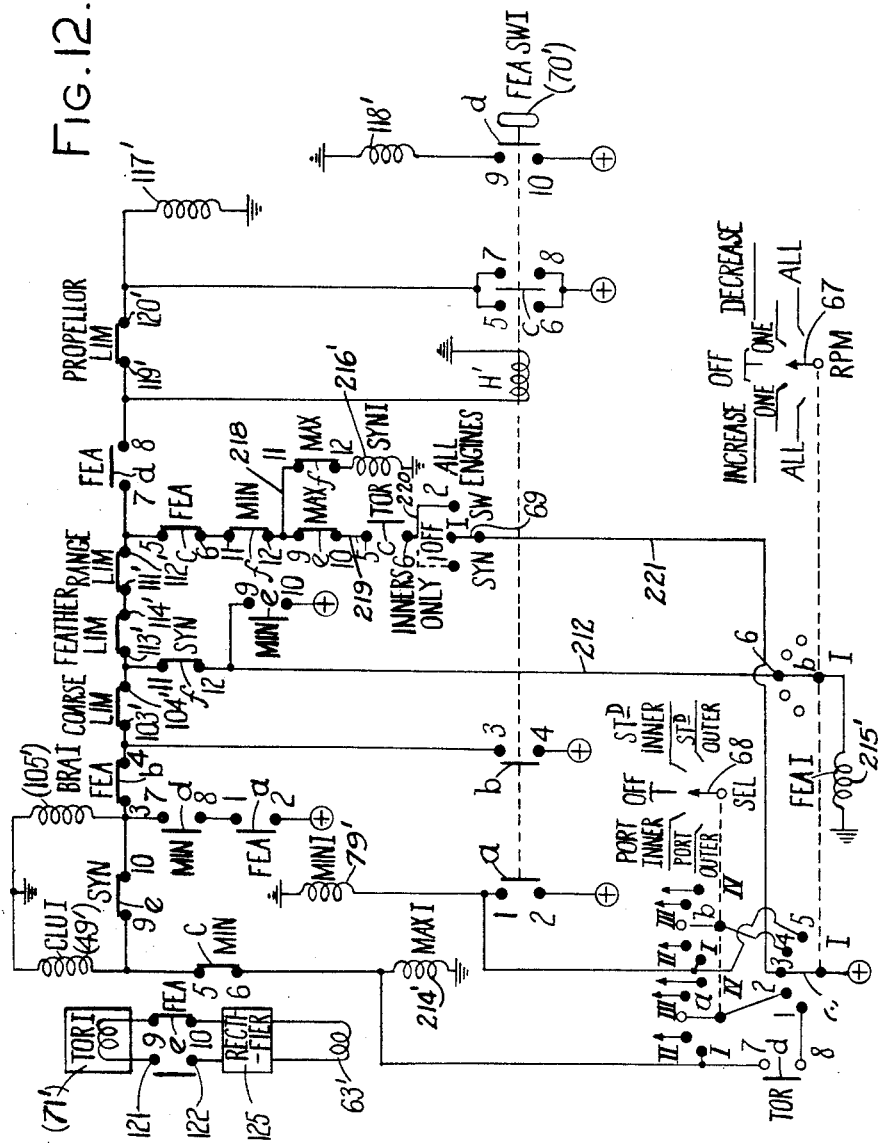

United States Patent Office 2,696,269
Patented Dec. 7, 1954

2,696,269

APPARATUS INCLUDING VARIABLE PITCH PROPELLERS FOR SYNCHRONIZING THE SPEEDS OF PRIME MOVERS

John Alfred Chilman, Gloucester, England, assignor to Rotol Limited, Gloucester, England, a British company Application March 3, 1951, Serial No. 213,710

20 Claims. (Cl. 170—135.29)

Apparatus for controlling the speed of a prime mover, such as an aircraft engine and propeller assembly, and for synchronising it with a datum speed is described in the specification of United States Patent No. 2,296,177 and comprises an alternating-current generator of which the frequency is related to a datum speed, a variable-datum speed governor for the prime mover, an alternating-current generator of which the frequency is related to the speed of the prime mover, a dynamo-electric machine to which current from the two generators is supplied and which responds to the frequency difference between the generators and therefore to the difference between the speed of the prime mover and the datum speed, and a direct mechanical connection between the dynamo-electric machine and the variable-datum speed governor whereby the datum-setting of the latter is varied in such sense as to remove or reduce the difference in speed.

In this apparatus the speed of the prime mover can be varied by moving a control member acting on the speed governor to displace the datum in the desired sense, such movement being effected in practice through a mechanical transmission from a control lever at the engineer's or pilot's station.

The object of the present invention is to provide an apparatus of the kind described which is adapted for control by electrical means from a remotely situated engineer's or pilot's station. The apparatus according to the invention is intended more particularly for the control of engine-propeller assemblies in aircraft comprising more than one such assembly but is applicable in other fields, for example marine installations and electrical generating plants.

According to the invention, apparatus for controlling the speed of a prime mover, comprises an A. C. generator of which the frequency is related to a datum speed, a variable-datum speed governor for the prime mover, an A. C. generator of which the frequency is related to the speed of the prime mover, an actuating device comprising (a) two frequency responsive dynamo-electric means each capable, when suitably energised, of raising and lowering said variable-datum and together capable of operation differentially upon said variable-datum, and (b) means electrically operable to confine the range of displacement of said variable-datum to a range of predetermined extent anywhere within its full range, switch gear for connecting one of said A. C. generators to one or other of said dynamo-electric means, or to both of them acting in unison, in one or the other sense, to raise or lower said variable-datum, and switch gear for simultaneously operating said range confining means and connecting said A. C. generators to said dynamo-electric means respectively in such sense that the latter operate differentially and control said variable datum to remove or reduce the difference between the datum speed and the speed of the prime mover.

The confined range of the variable-datum which is imposed during synchronous running is preferably such that should any fault occur in the control system during synchronous running the uncontrolled rise or fall of speed which can occur does not exceed safe limits. In the case of an aircraft engine installation the safe limits might be of the order of ±100 R. P. M.

It will be appreciated that the invention provides an actuating device comprising two frequency responsive dynamo-electric means each capable, when suitably energised, of moving a power take-off member in opposite senses and being capable of simultaneous operation either in unison or differentially, and means operable to confine the movement of the power take-off member to a range of predetermined extent anywhere within its full operating range of movement. In the case of a rotary power take-off member the operating range of movement may be infinite.

The invention also provides a speed control system for multi-engine power plants comprising three manually operable control members, one being movable into different positions according to whether it is desired to increase or decrease the speed of one or more of the engines, another being movable into different positions according to whether it is desired to vary the speed of a particular engine or of all of them together, and the third being movable into different positions according to whether it is desired to synchronise the running of two or more of the engines.

As applied to an aircraft power plant comprising more than one engine-propeller assembly the propellers are of the variable pitch type and are each controlled by a constant speed unit driven from the respective engine assembly. A dynamo electric actuator is coupled with each constant speed unit so as to be capable of moving the control member thereof to vary the loading on the spring of the governor mechanism and hence vary the datum speed of the assembly. The installation is controlled from the flight deck of the aircraft by three switches in addition to a known arrangement of feathering and unfeathering switches. One of these control switches, termed the "selector" is movable into different positions according to whether it is desired to vary the speed of a particular engine-propeller assembly or of all of them together, the second being movable into different positions according to whether it is desired to increase or decrease the speed of one or more of the engine-propeller assemblies, and being termed the "R. P. M. switch," and the third being movable into different positions according to whether it is desired to synchronise the running of two or more of the engine-propeller assemblies and being termed the "synchroniser."

The function of the R. P. M. switch is to control the connections of the stator windings of the dynamo-electric actuators so that the rotors remain locked when no change is required, and run in one or the other direction according to whether an increase or a decrease of R. P. M. is required. Whether one particular actuator or all of them is affected is determined by the setting of the selector switch.

The function of the synchroniser switch is to connect one of the stator windings of each of the units to be brought into synchronism, i. e. the slave units, to a synchronising frequency circuit supplied with current by the generator of the master engine, while the other stator windings of the slave units are connected, differentially with respect to the first, to their own generators. At the same time the synchroniser switch brings into operation the range-confining means of the dynamo-electric actuators, now acting as synchronisers, so that should any fault occur in the control system during synchronous running the uncontrolled rise or fall of speed which can occur does not exceed safe limits.

It is to be understood that the executive function of the switches described may be delegated wholly or in part to suitably constructed relays.

The control apparatus according to the invention may be used in conjunction with known systems of feathering and unfeathering, for example, the system described in the specification of United States patent application Serial No. 139,954, filed January 21, 1950, in the names of Leonard Gaskell Fairhurst and John Alfred Chilman. In this system each constant speed unit is provided with an overriding solenoid which adjusts the unit to the feathering position and is de-energised at the end of the feathering operation. By moving the R. P. M. control lever into a feathered position the pilot can prevent a feathered propeller from creeping back into pitch, and a corresponding provision is made in the apparatus of this invention.

For this purpose the dynamo-electric actuator is energised, during the feathering operation, to run in the direction to follow up the action of the overriding solenoid and holds the constant speed unit in the feathering position when the solenoid is de-energised. To this end, according to yet a further feature of this invention, means are provided to stop the running of the dynamo-electric actuator in the decreasing R. P. M. direction when the minimum running speed of the engine installation is reached, together with means for rendering such stop means inoperative during the feathering operation.

Figure 8:
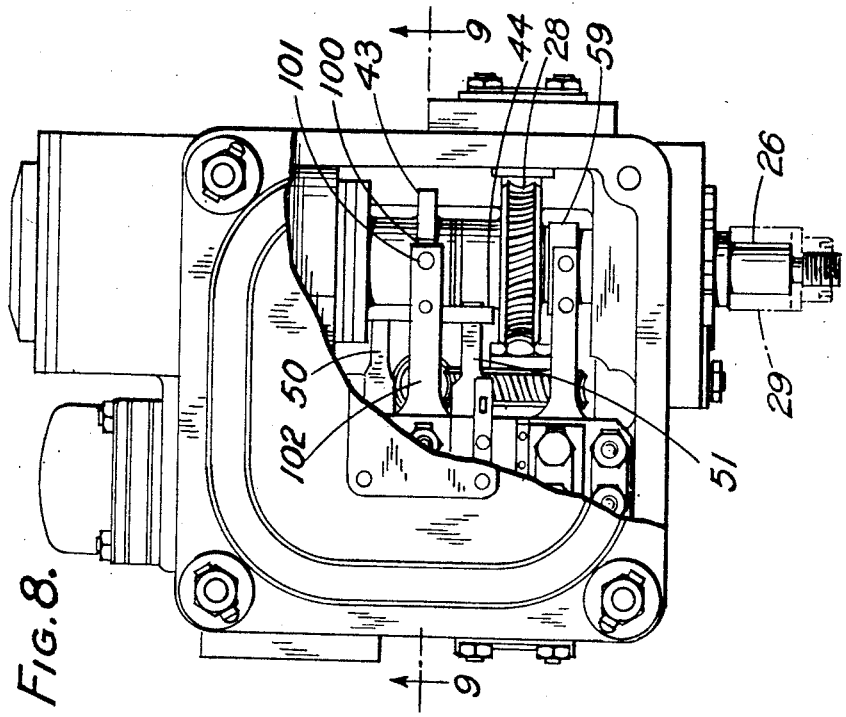
Figure 6:
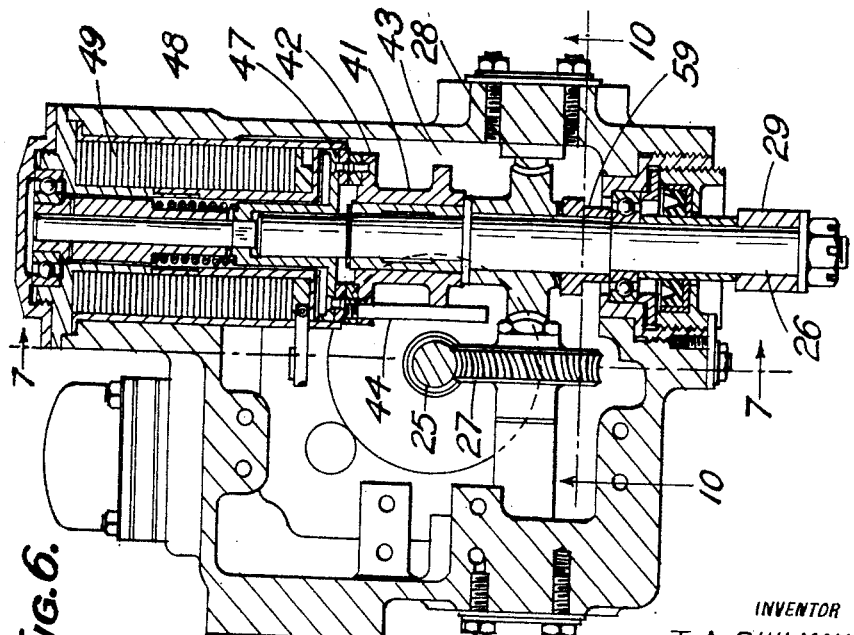
Figure 9:
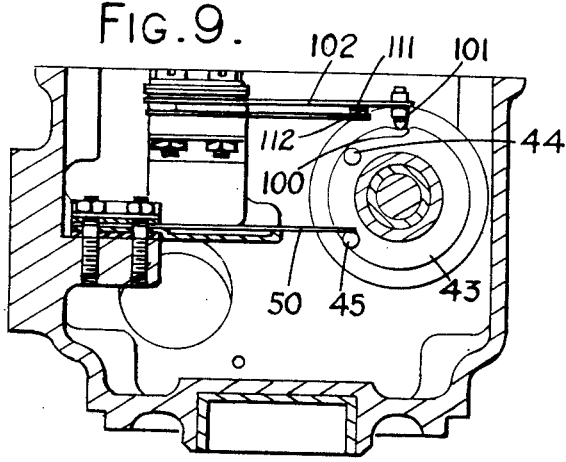
Figure 10:
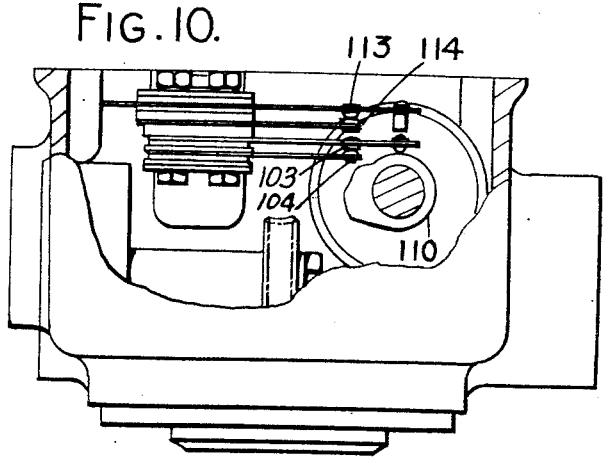

Two embodiments of the present invention will now be described, by way of example only, with reference to the accompanying drawings whereof:

Figure 1 is a diagrammatic perspective view of one construction of dynamo-electric actuator in accordance with the present invention, Figure 2 is a section on the line 2—2 of Figure 3 showing certain constructional details of the actuator of Figure 1, Figure 3 is a part section on the line 3—3 of Figure 2, Figure 4 is a block circuit diagram showing the electrical connections for a four-engine speed-control installation incorporating an actuator in accordance with Figures 1, 2 and 3, Figure 5 is a view corresponding to Figure 1 showing an alternative construction of dynamo-electric actuator in accordance with the present invention, Figure 6 is a section on the line 6—6 of Figure 7 showing certain constructional details of the actuator of Figure 5, Figure 7 is a part section on the line 7—7 of Figure 6, Figure 8 is an outside elevation of the actuator of Figures 6 and 7 and partly in section to show certain constructional details thereof, Figure 9 is a part section on the line 9—9 of Figure 8, Figure 10 is a part section on the line 10—10 of Figure 6, Figure 11 is a line circuit diagram corresponding to Figure 4 and showing a four-engine speed control installation incorporating an actuator in accordance with Figures 5 to 10 inclusive, certain control circuits being omitted from Figure 11 for the sake of clearness, Figure 12 is a circuit diagram of the control circuits (for one only of the engine installations) which have been omitted from Figure 11, and Figure 13 is a circuit diagram corresponding to part only of the circuit diagram shown in Figure 12 but for another of the engine installations.

Referring to Figures 1, 2 and 3:

The dynamo-electric actuator comprises a motor generally indicated by the reference numeral 21 having two stators with three-phase windings 22, 23, each capable of producing a rotating field and a rotor 24 mounted on shaft 25. The motor 21 is of the type described in the specification of U. S. Patent No. 2,296,177 with reference to Figures 2 and 5 but the other constructions described in said specification may be used if desired. The motor 21 drives a power take-off shaft 26 through a two-stage worm reduction gear 27, 28. A power take-off lever 29 is mounted on shaft 6 and is connected by a rod 30 to the operating lever of a constant-speed unit, which in Figure 1 is indicated by the reference numeral 31. The unit 31 is of conventional construction and comprises a sleeve 32 which is driven at a speed proportional to the speed of an engine-propeller assembly whose speed is to be controlled by the unit, a piston valve 33 mounted within the sleeve, a centrifugal governor 34 provided axially to adjust the sleeve 32 in relation to the piston valve 33 thereby to control the passage of pressure fluid to and from an hydraulic pitch change motor of the propeller, a governor spring 35, a sleeve 36 for varying the loading on the spring 35 and a lever 37 for adjusting the sleeve 36. The rod 30 is connected to the operating lever 37 of the unit 31 in any convenient or known manner thereby to adjust the loading on the spring 35 and the datum speed at which the engine propeller assembly will be maintained by the constant speed unit 31.

A sleeve 41 is mounted on the shaft 26 for free rotation thereon and has at one end a friction clutch surface 42 and at the other a flange 43 carrying two pins 44 and 45. Beyond the sleeve 41 a solenoid armature 46 is mounted on the shaft 26 and coupled thereto for rotation by a splined connection and the armature 46 has a clutch surface lined with friction material 47 adapted to engage the surface 42. The armature 46 is normally pressed against the surface 42 by a spring 48. A solenoid winding, diagrammatically indicated at 49, is provided which, when energised, axially adjusts the armature 46 to separate the clutch members 42, 47 and thus to declutch the sleeve 41 from the shaft 26. A pair of blade springs 50, 51 is mounted in parallel relationship on a block 52 and arranged so that their outwardly-facing surfaces are engaged by the pins 44 and 45 respectively, as shown in Figure 1. For this purpose, and as is apparent from Figure 1, the pins 44 and 45 are spaced apart circumferentially on the flange 43. At an intermediate point of their length the spring blades 50, 51 are provided on their inwardly-facing surfaces with abutments 53, 54 which, when either blade is deflected inwardly by pressure from the corresponding pin 44 or 45 moves into the path of one or other of abutments 55, 56, mounted on a disc 57 carried by the shaft 25 and driven therefrom through a torque limiting shock absorbing device 58 (see Figure 3).

A coarse pitch limit cam 59 is fixed to the shaft 26 and arranged to open a pair of electrical contacts 60, 61 when the shaft 26 approaches that part of its range which corresponds to the constant-speed unit 31 being adjusted by operating lever 37 to the minimum speed condition of the propeller. For clearness of illustration cam 59 is shown in Figure 1 as mounted on the opposite end of shaft 26 to the take-off lever 29, but, as is apparent from Figure 2, the cam 59 is mounted on the same end of shaft 26 as said lever. In Figure 3 it will be noted that a flywheel 62 which has not been shown in Figure 1, is mounted on the shaft 25 of motor 21, the flywheel being provided to reduce the acceleration of the rotor 24 during switch operations.

A dynamo-electric actuator and a constant speed unit 31, as described, are provided for each engine-propeller assembly together with a three-phase alternator. The dynamo-electric actuator of Figure 1 is associated with an alternator 63 which is driven by a shaft 65 from the engine 64 with which the actuator is associated.

The system described is controlled from a panel 66 at the pilot or chief engineer's station. The panel shown in Figure 1 is suitable for the four-engine installation illustrated in Figure 4 and comprises three switch controllers. The controller 67 marked "R. P. M." can be turned anti-clockwise from the central "Off" position shown in Figure 1, firstly, to a "Decrease One" position and then to a "Decrease All" position and in the clockwise direction it can similarly be turned, firstly, to "Increase One" and then to "Increase All." The controller 68 marked "Selector" can similarly be turned from a central "Off" position anti-clockwise to "Port Inner" and "Port Outer" positions and clockwise to "Starboard Inner" and "Starboard Outer" positions. The controller 69 marked "Synchroniser" has a central "Off" position and can be turned to an "Inners Only" position in one direction and an "All Engines" position in the other direction. The control system also incorporates a feathering switch for each propeller. The feathering switch is not shown on the panel 66 of Figure 1 but is diagrammatically illustrated in Figure 4 and is indicated by the reference numeral 70¹, 70², 70³ and 70⁴ respectively for the engines I (port outer), II (port inner), III (starboard inner) and IV (starboard outer). When the feathering switch is raised the feathering operation is initiated and when the feathering switch is lowered the unfeathering operation is commenced.

A control system for a four-engine installation incorporating, for each engine, a dynamo-electric actuator as shown in Figures 1, 2 and 3, is illustrated in Figure 4 to which reference will now be made.

Describing the diagram generally, for engine No. I, 63¹ is the 3-phase alternator, 49¹ the clutch solenoid, 22¹ and 23¹ the stator windings of the actuator motor, 60¹ and 61¹ the contacts of the coarse pitch limit switch, and 71¹ is a torque relay which in the event of the engine ceasing to develop torque, or more generally, propulsive thrust, changes a switch arm 72¹ over from a contact 73¹ to a contact 74¹. Each engine group also comprises the following parts associated with the control panel 66—an R. P. M. control switch 75¹ in circuit between the alternator and the stator winding 22¹, an R. P. M. control switch 76¹ in circuit between the alternator and the stator winding 23¹, selector switches 77¹, 78¹ in alternative circuits from the alternator to the switches $75^1$, $76^1$ respectively, and a minimum R. P. M. switch $79^1$ operated by means of a relay energised by the closing of the feathering switch $70^1$ in the upward, feathering, direction and in circuit between the alternator $63^1$ and the R. P. M. switch $75^1$ and also controlling a circuit to the clutch solenoid $49^1$ by-passing the coarse pitch limit switch $60^1$, $61^1$ which is itself in a circuit between the solenoid $49^1$ and the R. P. M. switch $75^1$. A corresponding circuit connects the solenoid $49^1$ and the R. P. M. switch $76^1$. The torque relay $71^1$ is also energised by closing the switch $70^1$ either in the upward, feathering, direction or in the downward, unfeathering, direction. In the engine groups II, III and IV corresponding parts are denoted by the same reference numerals as those detailed above but with the appropriate suffix 2, 3 or 4 respectively.

It is to be understood that all the R. P. M. switches $75^1$, $76^1$, $75^2$, $76^2$ and so on are operated simultaneously by the R. P. M. controller 67, that similarly all the selector switches $77^1$, $78^1$, $77^2$, $78^2$ and so on are operated simultaneously by the selector controller 68.

In the arrangement shown, the port inner engine (No. II) is predetermined as the primary master engine, and no provision is therefore required for applying one of the actuator windings $22^2$, $23^2$ with current from any of the alternators of the other engines for synchronising purposes. On the contrary, however, provision must be made for supplying current from its alternator $63^2$ to the other engine groups, these groups being provided with synchronising switches $81^1$, $81^3$ and $81^4$ for this purpose all operated in common by the synchronising controller 69. When this controller is turned to the "Inners Only" position, no change is made in the engine groups I and IV, but in the engine group III (starboard inner) the circuit direct from the alternator $63^3$ to the R. P. M. switch $76^3$ is interrupted and the latter is connected to the master engine alternator $63^2$ by way of the contact $82^3$ and the synchronising datum frequency circuit 84. When controller 69 is turned to the "All Engines" position, the R. P. M. switches $76^1$, $76^3$ and $76^4$ are connected to the master alternator $63^2$ by way of the contacts $83^1$, $83^3$ and $83^4$ respectively. To allow for the possibility of the primary master engine No. II failing, provision is made for passing on this function to one of the other engines. In the arrangement shown, changing over of the switch $72^2$ by the torque relay $71^2$ upon failure of engine No. II connects the alternator $63^4$ by way of the contact $74^2$ to the synchronising datum frequency circuit 84, so that engine No. IV now acts as the master engine. Finally, the function of the circuits $85^1$, $85^3$ and $85^4$ between the torque switch contacts $74^1$, $74^3$ and $74^4$ respectively and the synchronising datum frequency circuit 84 is to ensure that the actuator stator windings of stopped engines are supplied with current of the same frequency so that their rotors are locked in the positions they had when the torque failed, and also so that feathering and unfeathering of the propeller of a stopped engine can be effected as will be further described.

Considering now the operation of the system, when the synchroniser and R. P. M. controllers 69 and 67 respectively are both in the "Off" position, for example in the case of engine No. I, the stator windings $22^1$, $23^1$ are connected in the differential sense to the engine's own alternator $63^1$ so that they receive equal frequency current by way of the circuits through the R. P. M. switches $75^1$, $76^1$, by-passing the selector switches $77^1$, $78^1$, and the rotor 24 is locked against rotation.

When the selector controller 68 is moved, for example, to the "Port Inner" position and the R. P. M. controller 67 to an "Increase" position, the stator winding $23^2$ is energised through the selector switch $78^2$ and the R. P. M. switch $76^2$ in the reversed sense relatively to the stator winding $22^2$ and at the same time the clutch $49^2$ is disengaged, so that the actuator operates to adjust lever 37 on the constant speed unit 31 to reduce propeller pitch and hence increase R. P. M. This action continues until the pilot moves the R. P. M. switch back to "Off" or until the control lever of unit 31 comes to the end of its range and mechanically stops further running of the actuator.

If the selector controller 68 is moved to the "Starboard Inner" position and the R. P. M. controller 67 to a "Decrease" position, the stator winding $22^3$ is energised through the selector switch $77^3$ and the R. P. M. switch $75^3$ in the reversed sense relatively to the stator winding $23^3$ and at the same time the clutch of solenoid $49^3$ is disengaged, so that the actuator runs in the direction acting on the constant speed unit to increase propeller pitch and hence reduce R. P. M. This action continues until the pilot moves the R. P. M. controller 67 back to "Off" or until the coarse pitch limit cam 59 opens the limit switch $60^3$, $61^3$ thereby allowing the friction clutch 42, 47 to engage so that one of the blade springs 50, 51 is gradually moved towards the disc 57 until its abutment 53, 54 encroaches on the path of the corresponding abutment 55, 56 on the disc 57 and stops the running of the actuator in the position corresponding to the minimum running speed of the engine.

Supposing in the case of engine No. IV, that the selector and R. P. M. controllers 68 and 67 respectively are in their "Off" positions and the feathering switch $70^4$ is closed in the upward, feathering, direction, contacts not shown on the drawing cause the feathering solenoid of the constant speed unit to be energised and start the feathering motor running so that the propeller is quickly feathered. By means of the contacts shown on the drawing the torque relay $71^4$ and the minimum R. P. M. relay $79^4$ are also operated, whereby current is supplied to the clutch solenoid $49^4$ and the connections to the stator winding $22^4$ are reversed by the relay $79^4$, for example as later described, with reference to Figure 11, and both stator windings $22^4$, $23^4$ are connected to the synchronising frequency circuit 84, so that the actuator motor 21 runs in the direction to move the operating lever 37 on the constant speed unit 31 into the feathering position and thereby lock this unit. If the selector controller 68 had been left in the "Starboard Outer" position and the R. P. M. controller 67 in a "Decrease" position, the stator winding $22^4$ would have been already excited in the required sense, so that the minimum R. P. M. relay would not have had to carry out this function. The energisation of the feathering solenoid and the operation of the feathering motor are finally stopped in known manner in the case of a hydraulically operated propeller by the opening of a switch by oil pressure building up at the end of the operation. The minimum R. P. M. relay remains energised by a holding circuit which can be broken only by moving the R. P. M. controller from the "Off" position when the selector controller is set to the engine whose propeller has been feathered.

The unfeathering procedure is as follows:
1. The selector controller 68 is set to the engine whose propeller is to be unfeathered, thereby ensuring that the holding circuit of the minimum R. P. M. relay is completed through the "Off" position of the R. P. M. controller 67.

2. The R. P. M. controller 67 is set to the "Increase One" (or "Increase All") position thereby
   (a) Connecting up the actuator windings in the sense to move the lever 37 of the constant speed unit in the increasing R. P. M. direction when the minimum R. P. M. relay is de-energised (until this occurs the effect of the minimum R. P. M. relay, as stated above, is to reverse the connections to the stator winding $22^4$ so that the net result is that the actuator is locked).
   (b) To break the holding circuit of the minimum R. P. M. relay so that the actuator motor runs in a direction ensuring that the lever 37 on the constant speed unit is moved out of the "feathering" range into the engine operation range.

3. The feathering switch $70^4$ is closed in the downward, unfeathering, direction with the result that the feathering motor runs and oil under pressure is supplied to the propeller to carry out the unfeathering operation. A circuit is also completed through the torque relay $71^4$ to ensure that this is in the no-torque setting. When the propeller is windmilling the feathering switch is released, the above-mentioned circuits are broken, and the propeller "constant speeds" in relation to the setting of the lever 37 of the constant speed unit.

4. If the speed is too high the R. P. M. controller is set to the "Decrease One" position, with the result that the actuator motor 21 is reversed and runs in the decreasing R. P. M. direction until the R. P. M. controller is moved to the "Off" position or, if desired, until the cam 59 opens the limit switch $60^4$, $61^4$ so that the clutch solenoid $49^4$ is de-energised and the actuator stops with the R. P. M. lever of the constant speed unit in the minimum R. P. M. position.

5. The engine controls are now set for starting, and when the engine starts the torque relay is de-energised so that the arm 72⁴ changes over to the contact 73⁴ connected to the engine's own alternator 63⁴.

As already mentioned, the selective feathering system described in United States patent application Ser. No. 139,954, filed January 21, 1950, in the names of Leonard Gaskell Fairhurst and John Alfred Chilman, can be used in conjunction with the control system of the present invention. When the selective feathering system is used with the present invention a pair of contacts is provided on the minimum R. P. M. relay which are in series with the torque relay contacts of the feathering circuit and are connected together only when the minimum R. P. M. relay is not energised. In this way, when one propeller has already been feathered, its feathering circuit is interrupted at these contacts by reason of the fact that the minimum R. P. M. relay remains energised, and if the selective feathering button is again pressed, only the feathering circuit of a newly failed engine is completed.

If it is desired to synchronise the inboard engines only, the synchroniser controller is turned to the "Inners Only" position and the R. P. M. and selector controllers are turned to their "Off" positions. The alternator 63² of the master engine is then connected through the R. P. M. switches 75², 76² to both stator windings of motor 21 associated with the master engine, thereby locking this control, and through the synchronising switch contact 82³ to the stator winding 23³ of the starboard inner engine in the differential sense with respect to the excitation of the stator winding 22³ through the R. P. M. switch 75³ by the alternator 63³. The clutch solenoids 49² and 49³ are not energised and the range within which synchronism can be effected is therefore limited to ±100 R. P. M. Supposing that in fact this range is insufficient to enable synchronism to be attained from the preliminary approximate settings made by the pilot, it is merely necessary to "flick" the R. P. M. controller to an operative position and this will momentarily disengage the clutch, allowing the sleeve to turn back under the pressure of whichever of the blade springs 50, 51 is deflected. A shift of the range available for synchronisation by 100 R. P. M. in the required direction is thus effected.

If the synchronising controller 69 is turned to the "All Engines" position, the stator windings 23¹, 23³ and 23⁴ of the three slave engines are energised from the synchronising frequency circuit 84 through the contacts 83¹, 83³ and 83⁴ respectively. In other respects the condition of the slave engine units is similar to that of the starboard inner engine unit as already described, and similar remarks apply.

Should one of the slave engines fail, for example, the starboard outer engine IV, the torque of this engine will fall to zero (which will be before the R. P. M. falls) and the torque relay 71⁴ will move the switch arm 72⁴ across to the contact 74⁴ so that instead of the stator winding 22⁴ being energised by the alternator 63⁴ it is connected to the synchronising frequency circuit 84. The two stator windings 22⁴ and 23⁴ are now supplied with current of equal frequency and act differentially upon the rotor, so that this control is locked against rotation.

In the case of failure of the primary master engine No. II, when the torque of this engine falls to zero, the torque relay 71² changes the switch 72² over to the contact 74², thereby connecting the synchronising frequency circuit 84 to the alternator 63⁴ of the alternative master engine IV. The stator windings 22⁴, 23⁴ of this unit are now supplied with equal frequency current in the differential sense, so that this control is locked. No change occurs in the actuator circuit of the failed master engine II, except that it is now supplied from the alternator 63⁴ instead of 63³, so this control remains locked.

As has already been described, during the feathering operation the motor 21 of the dynamo-electric actuator is energised to run in the direction to follow up the action of the feathering solenoid of the constant speed unit and holds the constant speed unit in the feathering position when the solenoid is de-energised for which purpose both stator windings of the actuator are connected to the synchronising frequency circuit 84 to lock the actuator in the feathered position.

In an alternative arrangement there is provided a friction brake which is electro-magnetically released, the brake being applied when the feathered position is reached to lock the rotor 24 of the motor 21 against rotation. The electro-magnetic brake is also utilised to prevent operation of the actuator motor 21 when the limited synchronising range referred to above is exceeded and when the engine speed is reduced to its idling or minimum value.

An actuator incorporating such an electro-magnetic brake is shown in Figures 5 to 10 of the accompanying drawings to which reference will now be made.

The dynamo-electric actuator is generally of the same construction as that described with reference to Figures 1, 2 and 3 and like parts bear like reference numerals. The actuator is connected through lever 30 (Figure 5) to the operating lever of a constant speed unit as before. This constant speed unit is of the same construction as the constant speed unit 31 hereinbefore described with reference to Figure 1, and is not therefore shown again in Figure 5. As shown more particularly in Figure 9, the flange 43 has a cut-away portion 100 constituting a cam co-operating with a follower 101 carried by a blade spring 102 which itself carries an electrical contact 103. When the follower 101 is resting in the lowest part of the cam surface 100 the contact 103 engages a contact 104 thereby completing an electric circuit through the winding 105 of a magnet 106 constituting a pull-off device for a non-rotating brake disc 107 that is pressed by springs 108 against a brake disc 109 secured to the shaft 25 of the rotor 24 of motor 21. Consequently, in this condition, the brake 107, 109 is rendered inoperative and the rotor 24 is free to revolve. The cam surface 100 is so shaped that the contacts 111, 112 (hereinafter referred to as the range limit switch) remain closed during the limited range of movement of the power take off lever 29 permitted during synchronising and open if this range is exceeded in either direction. The circuit of the winding 105 is thus broken and the brake members 107, 109 are thrust together by the springs 108 to stop the running of the motor 21.

Fixed to the power take off shaft 26 is a coarse pitch limit cam 110 which is arranged to open a pair of electrical contacts 103, 104 (Figures 5 and 10) in circuit with the brake winding 105 when the shaft 26, moving in the decreasing R. P. M. direction, reaches a position corresponding to the constant speed unit 31 being adjusted to its minimum speed condition. During normal R. P. M. adjustments the dynamo-electric actuator is thus prevented from moving the constant speed unit into the feathering range. When feathering is required the operation by the pilot or engineer of a feathering control closes an electric switch bypassing the contacts 103, 104 so that the brake 107, 109 is released and the actuator motor 21 moves the shaft 26, and therefore the lever 37 of the constant speed unit, towards the feathered position. The cam 110 is provided with a second rise (see Figure 10) which, when the feathered position is reached opens a further pair of contacts 113, 114 in the circuit of brake winding 105 so that the brake 107, 109 is again applied. Accordingly the contacts 113, 114 are referred to as the feathering limit switch.

An application of the actuator shown in Figures 5 to 10 inclusive to a four-engined installation is diagrammatically shown in Figures 11 and 12 in which Figure 11 shows the A. C. circuits for the installation and Figure 12 the D. C. circuits relating to the port outer engine No. I. The direct current circuits of the other engines are identical apart from the connections to the selector controller 68, as will be clear from the following description.

In Figures 11 and 12 certain of the parts bear captions for a purpose which will shortly be made clear and in addition, where convenient, certain of these parts also bear the reference numerals, previously used for these parts in the description of Figures 1 to 5. As in Figure 4 these reference numerals bear the suffixes 1, 2, 3 and 4 to indicate that they are associated with engines I, II, III and IV respectively. A similar procedure has been followed with reference to the captions which bear the Roman suffixes I, II, III and IV to indicate that they are associated respectively with these engines.

The installation comprises the R. P. M. controller 67, the selector controller 68 and the synchroniser controller 69 which are indicated respectively by abbreviations R. P. M. SEL and SYN SW. Considering controller 67, as already described, this is movable into the five positions shown in Figure 12 and carries with it for each engine two movable contacts a and b. Contact a engages contacts 1, 2, 3, 4 and 5 in the five positions respectively these being all circuit-forming connections and to make this clear these contacts are accordingly shown in black. The contact b however only engages a circuit-forming contact in the "Off" position of controller 67 and the remaining contacts are idle and to make this clear they are shown as plain circles. In the following description a contact made at this switch will be noted by the code "RPM I$a$1" or "RPM IV$b$3" as the case may be, the Roman numeral indicating the engine and a similar system will be used with the other switches and relays constituting the installation.

The selector controller 68 is movable into five positions as shown, and carries two movable contacts $a$ and $b$ common to all engines. These contacts engage fixed contacts I, II, III and IV pertaining to the respective engines and an idle contact in the central "Off" position of the controller. It will be seen that the contacts I are connected into the circuit shown in Figure 12 since this is the circuit of engine I and it is to be understood that in the circuits pertaining to the other engines contacts II, III and IV will be used respectively in place of I.

The synchronising controller 69 is movable into three positions as shown and carries a movable contact for each engine which is denoted by the respective Roman numeral pertaining to the engine and engages either an idle contact in a central "Off" position or circuit forming contacts in the "Inners Only" and "All Engines" positions respectively. For inner engines II and III contacts 1 and 2 are interconnected as shown dotted in Figure 12, but for the outer engines I and IV the dotted connection is omitted so that contact 1 becomes an idle contact.

The control panel also comprises a feathering and unfeathering switch 70 for each engine, the switch pertaining to engine No. I being denoted in Figure 12 by the abbreviation FEA SW I. For simplification of the circuit diagram the feathering switch is shown separated into a number of component parts having movable contacts $a$, $b$, $c$ and $d$ respectively. The switch is of the push-pull type with an intermediate off position, pushing to the left in Figure 12 serving to initiate feathering and pulling towards the right to initiate unfeathering. The moving contacts $a$, $c$, $d$, serve to connect pairs of contacts 1—2, 5—6 and 9—10 in the feathering direction, while movable contacts $b$ and $c$ serve to connect pairs of contacts 3—4 and 7—8 in the unfeathering direction. There is also a hold coil H which serves to maintain the switch in the feathering position until the completion of this operation.

The four engine-driven alternators are shown in Figure 11 at $63^1$, $63^2$, $63^3$ and $63^4$ and the actuator windings at $22^1$, $22^2$ and $23^1$, $23^2$ and so on. As previously explained these are all three-phase windings but they are shown as single phase in Figure 11 to simplify the diagram. The clutch and brake windings $49^1$ and $105^1$ respectively are also indicated by the captions CLU I and BRA I respectively while the associated limit switches are denoted by the reference numerals $111^1$—$112^1$, $103^1$—$104^1$ and $113^1$—$114^1$ to correspond with Figures 5 to 10. Also shown in Figure 12 are the feathering pump motor $117^1$ and the overriding coil $118^1$ of the constant speed unit. When coil $118^1$ is energised it overrides the constant speed unit to move the control valve thereof in the pitch-coarsening sense to allow feathering to take place. A further limit switch (termed the propeller limit switch) comprises a pair of contacts $119^1$—$120^1$ which are opened when the propeller blades are in their feathered position.

The installation also comprises the following relays for each engine:

(i) A torque relay 71 (bearing the caption TOR) the winding of which is supplied through a rectifier 125 from its alternator 63 and which comprises four movable contacts $a$, $b$ (Figure 11) and $c$, $d$ (Figure 12). The contacts $a$ and $b$ make alternative contact with contacts 1—2, 3—4 and are representative of a three-phase system while $c$ and $d$ connect contacts 5—6 and 7—8 respectively.

It may be noted here that Figure 12 shows all the relays in their de-energised position from which it will be understood that contacts 5—6 and 7—8 referred to in the preceding paragraph are bridged when relay TOR is energised.

(ii) Minimum speed relay 79 (bearing caption MIN) the winding of which is energised when an adjustment of the speed in the downward direction (i. e. pitch coarsening) is required, that is to say:

(a) When the controller 67 is set to "Decrease All," all the relays 79 are energised through R. P. M. I to IV$a$5 that is to say, relay $79^1$ is energized through R. P. M. I$a$5, relay $79^2$ is energized through R. P. M. II$a$5, relay $79^3$ through R. P. M. III$a$5 and relay $79^4$ through R. P. M. IV$a$5.

The energizing circuit for relay $79^1$ through R. P. M. I$a$5 is shown in Figure 12. As previously explained Figure 12 shows only the D. C. circuit for engine No. I. Each engine has its own R. P. M. switch with moving contact $a$, and in Figure 13, by way of further example, there is shown part of the D. C. circuit for engine No. II including the R. P. M. switch for engine No. II designated R. P. M. II. This switch is controlled by controller 67 and is moved in unison with R. P. M. I$a$, R. P. M. III$a$ and R. P. M. IV$a$. As may be seen from Figure 13 relay $79^2$ is energized thorugh R. P. M. II$a$5 as stated above.

(b) When the controller 67 is set to "Decrease One" and the controller 68 is set to the engine under consideration. Thus for example if the controller 68 is set to "Port Outer," $79^1$ is energised through SEL $b$I and R. P. M. I$a$4 (Figure 12). If the controller 68 is set to "Port Inner," $79^2$ is energized through SEL $b$II and R. P. M. II$a$ 4 (Figure 13).

(c) When the feathering switch 70 is moved to the feather position. Thus for example, $79^1$ is energised through FEA SW I1$a$2 (Figure 12) and $79^2$ is energized through FEA SW II1$a$2.

Each relay 79 comprises six movable contacts $a$, $b$ (Figure 11) and $c$, $d$, $e$, $f$ (Figure 12). The first group makes alternative connection with pairs of contacts 1—2 and 3—4 respectively and the second group bridge the pair of contacts 5—6, 7—8, 9—10 and 11—12.

(iii) A maximum speed relay 214 (bearing the legend MAX) the winding of which is energised when adjustment of the speed in the upward direction (i. e. a finer pitch) is required, that is to say:

(a) When the controller 67 is set to "Increase All," all the relays 214 are energised through R. P. M. I to IV$a$1 that is to say, relay $214^1$ is energized through R. P. M. I$a$1, relay $214^2$ is energized through R. P. M. II$a$1, relay $214^3$ is energized through R. P. M. III$a$1 and relay $214^4$ is energized through R. P. M. IV$a$1.

In Figure 12 for example, which is the D. C. circuit for engine No. I, when controller 67 is moved to "Increase All" moving contact of $a$ of R. P. M. I$a$ is moved to contact 1 and a circuit is made through R. P .M. I$a$1 TOR I8, TOR I7 and then from TOR I7 to contact I of part $a$ of selector switch SEL and to the upper end of relay $214^1$.

In Figure 13 which is part of the D. C. circuit of engine No. II, when the controller 67 is moved to "Increase All" to complete the circuit as described in the preceding paragraph, moving contact $a$ of R. P. M. II$a$ is also moved to contact I and circuit is made through R. P. M. II$a$1, TOR II8, TOR II7, and then from TOR II7 to contact II of part $a$ of selector switch SEL and to the upper end of relay $214^2$. The same is true of the relays $214^3$ and $214^4$.

(b) When the controller 67 is set to "Increase One" and the controller 68 is set to the engine under consideration. Thus, for example relay $214^1$ is energized through SEL $a$I and R. P. M. I$a$2 (Figure 12) and, by way of further example, relay $214^2$ is energized through SEL $a$II and R. P. M. II$a$2 (Figure 13).

(c) When the switch 70 is operated in the unfeathering sense. In this case each relay 214 is energised through contacts FEA SW 3$b$4 (Figure 12) as will be further explained.

Each speed relay 214 comprises six movable contacts $a$, $b$, $c$, $d$ (Figure 11) and $e$, $f$ (Figure 12). The first group makes alternative connection with pairs of contacts 1—2, 3—4, 5—6 and 7—8 respectively and the second group bridge the pairs of contacts 9—10 and 11—12.

(iv) A feathering relay 215 (bearing the caption FEA) the winding of which is energised when the feathering switch 70 is pushed to the left with controller 67 in its "Off" position. Closing of the contacts FEA SW1—2 energises relay 79 to close contacts MIN 9—10 and establish a circuit through conductor 212 R. P. M. $b$6 and FEA. This relay, which is also energised during the unfeathering operation as will be further described, comprises five movable contacts $a$, $b$, $c$, $d$ and $e$ which bridge pairs of contacts 1—2, 3—4, 5—6, 7—8 and 9—10 respectively.

(v) A synchronising relay 216 (bearing the caption SYN) the winding of which is energised under the control of controllers 69 and 67 when the former is in an operative setting for the engine concerned and the latter is in its "Off" setting. Referring to Figure 12, for engine I the circuit will accordingly be relay 216[1], MAX I11—12 conductor 218, MAX I9—10 conductor 219, TOR 15—6, conductor 220 SYN SW I2 conductor 221 and R. P. M. I$a$3. The synchronising relay pertaining to each of the slave engines (I, III and IV) comprises movable contacts $a$, $b$, $c$ and $d$ (Figure 11) connecting alternatively with the pairs of contacts 1—2, 3—4, 5—6 and 7—8 and all four relays comprise movable contacts $e$ and $f$ (Figure 12) bridging pairs of contacts 9—10 and 11—12.

A torque switch comprising contacts 121—122 is included in the circuit of each torque relay 71 and operates to open the circuit in response to a failure of the engine to develop propulsive power.

In the case where the engine is not provided with means for operating a torque switch, the constants of the circuit comprising the alternator 63, rectifier 125 and the winding of torque relay 71 may be so adjusted that the relay opens when the speed of the alternator, and therefore its voltage, falls below a predetermined minimum. On the other hand, when the torque switch can be so operated the torque relay may be energised from a battery source instead of through a rectifier as shown in Figure 12.

The manner in which the installation operates during steady running and to carry out various control requirements will now be described.

*Steady running (not synchronising)*

The controllers 67, 68 and 69 are in their "Off" positions and all four engines are running normally so that the torque relays 71 are energised, making contacts TOR I to IV$a$1 and $b$3. Considering the master engine No. II, neither the maximum nor the minimum relay is energised so that the actuator motor winding circuits are broken at MIN II$a$1 and $b$3 and at MAX II$c$5 and $d$7. The actuator motor therefore cannot run. Considering a slave engine, for example, engine No. I, the actuator motor winding circuits are broken at SYN I$c$6 and $d$8 and at MAX I$c$5 and $d$7. These actuator motors therefore also cannot run. Furthermore, examination of Figure 12 shows that the supply of current to the brake winding 105 pertaining to each engine is interrupted at the following points: R. P. M. $a$1, MIN 7—8, FEA SW3—4, MIN 9—10, SYN SW I1, FEA 7—8 and the brakes are therefore applied, preventing any creeping of the actuators from their adjusted positions.

*Synchronising all engines*

In this case controller 69 will be set to "All Engines," controllers 67 and 68 being still "Off," and circuits will be established through the brake windings and synchronising relay windings pertaining to each engine, as follows:

(*a*) BRA, FEA 3—4, coarse limit 103—104, feather limit 113—114, range limit 111—112, FEA 5—6, MIN 11—12, MAX 9—10, TOR 5—6, SYN SWI2, R. P. M. $a$3, and (*b*) SYN, MAX 11—12, MAX 9—10, TOR 5—6, SYN SW I2, R. P. M. $a$3. The brakes are consequently released and the synchronising relays energised.

The opening of contacts SYN 11—12 prevents energisation of the feathering relays, while that of SYN 9—10 prevents energisation of the clutch windings. The clutches are therefore engaged and if the predetermined safe range is exceeded will cause the range limit contacts 111—112 to open, thereby applying the brake. As will be clear from Figure 11 there are no synchronising relay contacts 1 to 8 for engine No. II since this is the master engine and the motor windings 22², 23² remain disconnected while the alternator 63² remains connected to the synchronising frequency circuit lines 123—124. Considering the slave engines, for example No. I, the motor coil 22¹ is now connected by SYN I$c$5 and $d$7 to the synchronising frequency lines 123 and 124 (contacts MAX I$a$1 and $b$3 being made since MIN I is not energised as indicated by arrow DE.EN on MIN I in Figure 11), while the motor coil 23¹ is connected by SYN I$a$2 and $b$4 to the alternator 63¹ (contacts MAX I$a$1 and $b$3 being made since MAX I is not energised as indicated by arrow DE.EN on MAX I in Figure 11). The motor windings are arranged to act differentially when thus connected, so that the engine is maintained in synchronism with the master engine in the known manner. As will now be appreciated, the arrows EN and DE.EN indicate which set of contacts are made when the relays SYN, MIN, MAX and TOR are energised and de-energised respectively.

*Synchronising inboard engines only*

Referring to Figure 13, when the controller 69 is turned to the "Inners Only" position the synchronising relays SYN II and also the synchronising relay SYN III in the circuit of engine No. III are energised through the moving contacts of SYN SW II and III to the fixed contact 1 instead of to the fixed contact 2, so that the operation of the inboard engines II and III is as described for synchronising all engines. The brake and synchronising relay circuits of the outboard engines are however broken at the synchronising switch, so that the corresponding motor windings are disconnected and the brakes are applied.

*Failure of slave engine*

Supposing, for example, that engine No. I fails while the controls are set for synchronising all engines, the corresponding torque relay 71¹ is de-energised and breaks the brake and synchronising relay circuits at TOR I5—6 so that the brake is applied and the motor windings are disconnected at SYN I$a$2 and $b$4 and at SYN I$c$5 and $d$7. The actuator for the failed engine is thus locked.

*Failure of master engine*

In this case de-energisation of the torque relay of the master engine No. II connects the synchronising frequency lines 123, 124 to the output of the alternator 63⁴ of the alternative master engine by way of contacts TOR II$a$2 and $b$4. Both motor windings of engine No. IV are now supplied with equal frequency current so that it takes over the role of master engine. The de-energisation of TOR II interrupts the brake circuit of that engine at TOR II5—6 so that its actuator is locked.

*Increasing R. P. M. of all engines*

For this operation the controllers 68 and 69 are in their "Off" positions, while controller 67 is set to its "Increase All" position. Assuming all engines are running, their torque relays will be energised closing the contacts TOR 7—8 and thereby energising the brake and clutch windings and the maximum speed relays through R. P. M. I to IV$a$1. The brakes and clutches are therefore released and in Figure 11 the motor windings are connected by contacts MAX I to IV$c$6 and $d$8 to the alternators of their respective engines in the sense to run the motors in the increasing R. P. M. direction. The opening of contacts MAX 11—12 prevents energisation of the synchronising relay.

*Increasing R. P. M. of selected engine*

In this case controller 67 is moved to its "Increase One" position and controller 68 to the position corresponding to the selected engine. Supposing this is No. I, it will be seen from Figure 12 that instead of the brake, clutch and maximum speed relay windings of all engines being energised through R. P. M. I to IV$a$1, only the windings of engine No. I, are energised through R. P. M. I$a$2 and SEL $a$I. Similarly, if contact $a$II, $a$III or $a$IV is made by adjustment of controller 68 the brake, clutch and maximum speed relay windings of the corresponding engines are energised.

*Decreasing R. P. M. of all engines*

For this operation the controllers 68 and 69 are in their "Off" positions, while controller 67 is set to its "Decrease All" position. All the relays 79 are accordingly energised through contact $a$5 of their R. P. M. switches I to IV respectively and the brake and clutch windings are energised through FEA 3—4, coarse limit 103—104, SYN 11—12, MIN 9—10. In Figure 11 energisation of the minimum speed relays 79 connects the motor windings to the respective alternators at MIN $a$2 and $b$4 in the sense to run the motors in the decreasing speed direction. If the actuators are allowed to run until the minimum speed is reached the coarse limit switches will open to interrupt the brake circuits at 111—112. It will also be noted that the feather switch relays are prevented from being energised by the breaking of their circuits at R. P. M. b5. Contacts MIN 5—6 and MIN 11—12 prevent energisation of the maximum speed and synchronising relays MAX and SYN respectively.

*Decreasing R. P. M. of selected engine*

The system operates in a similar manner to that described in connection with increasing R. P. M., that is to say controller 68, in this case through the moving contact *b*, acts to complete only the circuit of relay 79 of the engine the speed of which is to be decreased.

*Feathering*

At the commencement of this operation it may be assumed that controller 67 is "Off" and controller 69 may be either "On" or "Off." To feather the propeller of a particular engine, for example No. I, the feathering switch 70 is pushed to the left as seen in Figure 12 and the following circuits are established:

1. FEA SW I9—10, coil $118^1$.
2. FEA SW I5—6, feather pump motor $117^1$ and feather switch hold coil $H^1$. Coil $118^1$ overrides the speed governor and moves the control valve to its pitch coarsening setting, and the feathering pump supplies the necessary oil under pressure so that the feathering operation is quickly carried out. When the propeller blades are feathered the propeller limit contacts $119^1$—$120^1$ are separated, but the hold coil $H^1$ may not yet be de-energised since an alternative circuit has been established as will be described below.
3. FEA SW I1—2, MIN I. The energising of the minimum speed relay establishes the following further circuits: (*a*) MIN I9—10, R. P. M. I*b*6, FEA I. (*b*) MIN I9—10, SYN I11—12, feather limit $113^1$—$114^1$, range limit $111^1$—$112^1$ FEA I7—8, hold coil $H^1$. (*c*) FEA I1—2, MIN I7—8, BRA I (and CLU I through SYN I9—10). It will be noted that these circuits by-pass the coarse limit contacts $103^1$—$104^1$.

The energising of the feather switch relay interrupts the torque relay circuit at FEA I9—10 if this circuit has not already been interrupted by opening of the torque switch at 121—122. Opening of the contacts FEA I5—6 and TOR I5—6 prevent energisation of the synchronising relay SYN I, while opening of contacts MIN I5—6 prevents energisation of the speed relay MAX I.

In Figure 11, energisation of relay MIN I connects up the motor windings in the decreasing speed sense so that the actuator runs the control lever of the appropriate constant speed unit past the minimum speed setting to follow up the operation of the coil $118^1$ and prevent the control valve moving from the pitch coarsening setting when the coil is de-energised.

When the actuator reaches its feathered position the feather limit contacts 113—114 open thus interrupting the alternative circuit through the hold coil H. When, therefore, both the propeller and the actuator are in their feathered settings the hold coil is de-energised so that the feathering switch returns to its off position, thus de-energising relay MIN I and stopping the feather pump motor. The brake and clutch circuits are then interrupted at MIN I7—8 and the feather switch relay circuit at MIN I9—10. Operation of the actuator through the "Increase All" setting of the R. P. M. switch is prevented by the opening of the contacts TOR I7—8.

*Un-feathering*

Operation of the feathering switch to the right in Figure 12 establishes the following circuits:

1. FEA SW 7—8, feather pump motor 117.
2. FEA SW 3—4, FEA 3—4, BRA.
3. FEA SW 3—4, FEA 3—4, SYN 9—10, CLU.
4. FEA SW 3—4, FEA 3—4, SYN 9—10, MIN 5—6, MAX.

The fact that initially the coarse limit contacts 111—112 are open prevents energisation of the feather switch relay, while energisation of the synchronising relay is prevented firstly by the fact that the torque relay contacts TOR 5—6 are open and secondly by the opening of contacts MAX 9—10 and MAX 11—12.

In Figure 11 the torque relay of the engine under consideration will be de-energised so that the contacts TOR *a* and *b* are connected to the synchronising frequency lines 123 and 124, while energisation of the MAX relay connects up the motor windings in the increasing speed sense so that the actuator moves the control lever of the constant speed unit away from the feathered position and the control valve moves into the pitch-reducing position so that oil can pass from the feather pump to the propeller to move the blades towards the minimum speed pitch. When the actuator reaches the minimum speed setting the coarse limit contacts 103—104 close and complete a circuit FEA SW 3—4, coarse limit 103—104, SYN 11—12, R. P. M. *b*6, FEA. Energisation of the feather switch relay interrupts the circuits of the brake, clutch and MAX relays at FEA 3—4, so that the actuator is held at this setting. The closing of contacts MAX 9—10 and MAX 11—12 is offset by the opening of contacts FEA 5—6 so that the synchronising relay remains de-energised at least until the feathering switch is released, which breaks the feather switch relay circuit at FEA SW 3—4. The closing of contacts FEA 9—10 then prepares the torque relay circuit so that this is completed by the closing of the torque switch contacts 121—122 when the engine is started. The release of the feathering switch also breaks the feather pump motor circuit at FEA SW 7—8 so that the installation is restored to the minimum speed idling condition. It will be noted that the hold coil H is energised when the propeller limit contacts 119—120 close during unfeathering, but in these conditions it has no holding action on the feathering switch.

It will be appreciated that it is necessary to provide the separate motor driven feathering pumps because when an engine is stopped there is no other source of oil under pressure available for feathering or unfeathering. Whether the blades are moved towards the feathered or unfeathered position depends on the position of valve 33 in the constant speed unit. The feathering pumps always run in the same direction.

I claim:

1. Apparatus for controlling the speed of a prime mover comprising an A. C. generator of which the frequency is related to a datum speed, a variable-datum speed governor for the prime mover, an A. C. generator of which the frequency is related to the speed of the prime mover, an actuating device comprising two frequency responsive dynamo-electric means each capable, when suitably energised, of raising and lowering said variable-datum and together capable of operating differentially upon said variable-datum, and means electrically operable to confine the range of displacement of said variable-datum to a range of predetermined extent anywhere within its full range, switch gear for connecting one of said A. C. generators to one or other of said dynamo-electric means, or to both of them acting in unison, in one or the other sense, to raise or lower said variable-datum, and switch gear for simultaneously operating said range-confining means and connecting said A. C. generators to said dynamo-electric means respectively in such sense that the latter operate differentially and control said variable datum to remove or reduce the difference between the datum speed and the speed of the prime mover.

2. Apparatus according to claim 1 wherein the actuating device comprises two frequency-responsive, dynamo-electric means each capable, when suitably energised, of moving a power take-off member in opposite senses and being capable of simultaneous operation either in unison or differentially and means operable to confine the movements of the power take-off member to a range of predetermined extent anywhere within its full operating range of movement.

3. Apparatus as claimed in claim 2 wherein a centrifugal speed governor is provided comprising spring means adjustable to vary the datum speed of the governor, the take-off member being mechanically connected to said spring means to raise and lower said variable-datum.

4. Apparatus as claimed in claim 2 in which the range-confining means comprises a control member adapted to be drivingly-connected to the power take-off member, means for effecting said driving connection during operation of the dynamo-electric means within the predetermined range of movements of the take-off member and means actuated by the control member, on adjustment thereof by the power take-off, to stop the running of the dynamo-electric means.

5. Apparatus as claimed in claim 4 wherein the control member comprises a sleeve which is clutched to the power take-off member and carries an actuator for a switch connected in the circuit of an electro-magnetic brake for holding the dynamo-electric means stationary.

6. Apparatus as claimed in claim 4 wherein the control member comprises a sleeve which is clutched to the power take-off member and actuates stop members adapted mechanically to prevent rotation of the dynamo-electric means.

7. Apparatus as claimed in claim 5 wherein the sleeve clutch is normally engaged and is electro-magnetically disengaged under the control of limit switches actuated by the power take-off means.

8. Apparatus as claimed in claim 1 in which while speed adjustment by the apparatus is not required the dynamo-electric means is supplied with equal frequency current in the differential sense to lock it against rotation.

9. Apparatus as claimed in claim 1 wherein while speed adjustment by the apparatus is not required the dynamo-electric means is locked against rotation by brake means with or without interruption of the supply of current to the dynamo-electric means.

10. A speed control system as claimed in claim 9 in which the brake is spring-urged into engagement and is electro-magnetically released.

11. A speed control system for multi-engine power plants comprising speed-control apparatus as claimed in claim 1 and three manually operable control members, one being movable into different positions according to whether it is desired to increase or decrease the speed of one or more of the engines, another being movable into different positions according to whether it is desired to vary the speed of a particular engine or all of them together, and the third being movable into different positions according to whether it is desired to synchronise the running of two or more engines.

12. A speed control system as claimed in claim 11 in which the first manually operable control member referred to controls the connections of a stator winding of each dynamo-electric means so that the rotors are normally locked against rotation and, on adjustment of the control member, run in one or the other direction according to whether an increase or decrease of speed of one or more engines is required.

13. A speed control system as claimed in claim 11 for controlling a power plant comprising more than one engine-propeller assembly the propellers of which are of the variable-pitch type and are each controlled by a constant speed unit driven from the respective engine assembly, a dynamo-electric actuator being provided to adjust each constant speed unit and thereby vary the datum speed of the assembly, and an overriding solenoid to adjust said unit for feathering the propeller wherein the dynamo-electric actuator is energized, during the feathering operation, to run in a direction to follow up the action of the overriding solenoid and holds the constant speed unit in the feathering position when the solenoid is deenergised.

14. A speed control system as claimed in claim 13 wherein means are provided to stop the running of the dynamo-electric actuator in the decreasing speed direction when the minimum running speed of the engine installation is reached together with means for rendering such stop means inoperative during the feathering operation.

15. A speed control system as claimed in claim 14 in which said stop means comprises a switch actuator which becomes effective when the minimum engine running speed is reached to engage an electro-magnetic clutch which brings into operation mechanical means to prevent rotation of the dynamo-electric actuator.

16. A speed control system as claimed in claim 14 in which said stop means comprises a switch actuator which becomes effective when the minimum engine running speed is reached to engage an electro-magnetic clutch which brings into operation switch means connected in the circuit of an electro-magnetic brake for holding the dynamo-electric actuator stationary.

17. A speed control system as claimed in claim 11 in which means, responsive to the proper running of each engine to detect engine failure, is provided to hold the dynamo-electric actuator of the failed engine stationary.

18. A speed control as claimed in claim 17 wherein said means comprises switch gear responsive to engine running to connect the pair of stator windings of a failed engine to a single operative A. C. generator.

19. A speed control as claimed in claim 18 in which during synchronous control of the engine-propeller assemblies one of the assemblies is selected as a master whose speed is the datum which determines the speed of the slave assemblies and the engine-failure switch gear is provided to connect a slave engine to the master alternator and both stator windings of a failed slave engine to the master alternator.

20. A speed control as claimed in claim 19 wherein on failure of the master engine its engine-failure switch gear connects the A. C. generator of a slave engine into circuit for operation as the master engine and simultaneously connects the dynamo-electric actuator of the failed master engine to the newly-selected master engine to hold the actuator stationary.

References Cited in the file of this patent

UNITED STATES PATENTS

| Number | Name | Date |
| --- | --- | --- |
| 2,205,264 | Kalin | June 18, 1940 |
| 2,214,901 | Griffin | Sept. 17, 1940 |
| 2,217,856 | Brady | Oct. 15, 1940 |
| 2,232,753 | Wilson | Feb. 25, 1941 |
| 2,232,896 | Wilson | Feb. 25, 1941 |
| 2,246,516 | Herzog | June 24, 1941 |
| 2,296,177 | Newton | Sept. 15, 1942 |
| 2,431,687 | Drake | Dec. 2, 1947 |
| 2,433,432 | Chillson et al. | Dec. 30, 1947 |
| 2,465,358 | Curtis et al. | Mar. 29, 1949 |